(12) United States Patent
Kotidis et al.

(10) Patent No.: US 7,440,957 B1
(45) Date of Patent: Oct. 21, 2008

(54) UPDATES THROUGH VIEWS

(75) Inventors: Ioannis Kotidis, Lake Hiawatha, NJ (US); Divesh Srivastava, Summit, NJ (US); Ioannis Velegrakis, Lake Hiawatha, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 186 days.

(21) Appl. No.: 11/290,683

(22) Filed: Nov. 30, 2005

(51) Int. Cl.
*G06F 17/30* (2006.01)
(52) U.S. Cl. ..................... 707/100; 707/200
(58) Field of Classification Search .......... 707/2–4, 707/100, 200
See application file for complete search history.

(56) References Cited

U.S. PATENT DOCUMENTS

| | | | |
|---|---|---|---|
| 5,924,103 A * | 7/1999 | Ahmed et al. ............... | 707/201 |
| 6,449,605 B1 | 9/2002 | Witkowski | |
| 6,546,402 B1 | 4/2003 | Beyer et al. | |
| 6,609,122 B1 | 8/2003 | Ensor | |
| 6,735,717 B1 * | 5/2004 | Rostowfske et al. .......... | 714/13 |
| 6,751,619 B1 * | 6/2004 | Rowstron et al. ............. | 707/10 |
| 7,092,951 B1 * | 8/2006 | Luo et al. .................... | 707/100 |
| 7,181,452 B1 * | 2/2007 | Luo et al. ...................... | 707/8 |
| 7,243,088 B2 * | 7/2007 | Verma et al. ................... | 707/1 |

* cited by examiner

*Primary Examiner*—Cheryl Lewis
(74) *Attorney, Agent, or Firm*—Hoffmann & Baron, LLP

(57) ABSTRACT

A method and system are disclosed that allow database views and base tables to be treated identically with respect to queries, insertions, deletions and updates. The method and system include separating the data instance of a view into a logical data instance and a physical data instance. The physical data instance is extended to include identifiers on data values that are used to query insert, delete and update information in base tables. The manner in which users and applications interface with the view remains unchanged since those interactions occur at the logical level.

11 Claims, 6 Drawing Sheets

FIG. 6

| Personnel | |
|---|---|
| dep | emp |
| CS | Fox |
| ~~EE~~ | ~~Fox~~ |
| Phil | Jones |
| EE | Fox p |
| EE | 10 d₁₀ |
| EE | 23 d₂₃ |
| EE | 45 d₄₅ |

| Teaching | | |
|---|---|---|
| prof | equip | sem |
| Fox | proj | PL |
| Fox | proj | OS |
| Fox | proj | DB |
| Fox | lp | OS |
| Jones | mic | DB |
| Fox p | proj | PL |
| Fox p | proj | OS |
| ~~Fox p₁₀~~ | ~~proj~~ | ~~DB~~ |
| ~~Fox p₂₃~~ | ~~proj~~ | ~~DB~~ |
| ~~Fox p₄₅~~ | ~~proj~~ | ~~DB~~ |
| Fox p | lp | OS |
| Fox p | proj | DB p |
| Fox d₁₀ | proj | DB d₁₀ |
| Fox d₂₃ | proj | DB d₂₃ |
| Fox d₄₅ | proj | DB d₄₅ |

| Schedule | | |
|---|---|---|
| cour | rm | day |
| PL | 10 | Mon |
| DB | 10 | Tue |
| DB | 23 | Wed |
| DB | 45 | Fri |
| DB d₁₀ | 10 | Tue |
| DB d₂₃ | 23 | Wed |
| DB d₄₅ | 45 | Fri |

UPDATES THROUGH VIEWS

TECHNICAL FIELD

The present invention generally relates to relational database management systems, and more particularly to databases using views.

BACKGROUND OF THE INVENTION

Generally, a database view is a virtual or logical database table composed of the result set of a pre-compiled query. A view provides limited access to only portions of database tables that are relevant to an application. Typically, database views achieve schema independence by allowing certain physical database changes to occur while keeping the logical view interface unchanged.

Views are usually virtual meaning that their instance data is completely defined by applying the view query on base tables. Due to this virtual nature, view updates need to be translated to updates on base tables in a way that the view state after the update is the same as if the update was applied to a materialized view (i.e., a physical copy of a view that is stored or maintained).

The prior art has shown the difficulty of translating view updates in a side-effect free manner. For example, as described in the publication *On the Correct Translation of Update Operations on Relational Views*, ACM TODS, 8(3): 381-416, 1982, which is incorporated herein by reference, Dayal and Bernstein disclose generating translations for view updates. The views disclosed in Bernstein, however, are restricted to those without join attributes in the view interface. Similarly, as described in *Update Semantics of Relational Views*, ACM TODS, 6(4):557-575, December 1981, which is incorporated herein by reference, Bancilhon and Spyratos disclose using a view complement to determine the existence of unique translations. Computation of the view complement, however, has been shown to be NP-Complete (See S. Cosmadakis and C. Papadimittiou, *Updates of Relational Views*, In PODS, page 317, March 1983, which is incorporated herein by reference).

Accordingly, there is a need to achieve side-effect free translations for various types of view updates. Furthermore, there is a need to translate a view deletion in a manner that does not affect the instance of any other subview (e.g., a sub-query of a view) defined for the view.

SUMMARY OF THE INVENTION

Techniques are disclosed that allow database views and base tables to be treated identically with respect to queries, insertions, deletions and updates. The techniques include separating the data instance of a view into a logical data instance and a physical data instance. The physical data instance is extended to include identifiers on data values that are used to query insert, delete and update information in base tables. The manner in which users and applications interface with the view remains unchanged since those interactions occur at the logical level. Additional details of this technique are described in the publication *Updates Through Views: A New Hope,* 22nd International Conference on Data Engineering, Apr. 3-7, 2006, which is incorporated herein by reference.

Various aspects of the system relate to processing database view requests in a side-effect free manner. For example, according to one aspect, a method includes propagating arbitrary updates to views to underlying base tables by associating an identifier with a data value included in a physical data instance, the physical data instance derived from at least one base table, mapping at least one of a tuple insertion, a tuple deletion and a value update to the physical data instance using a view definition and the identifier, and applying the at least one of a tuple insertion, a tuple deletion and a value update to the physical data instance.

In some preferred embodiments, the method also may include generating a clone tuple and a preserve tuple. The clone tuple and preserve tuple are associated with at least one of the tuple insertion, the tuple deletion and the value update. The method may also include generating a join-graph that is used in applying at least one of the tuple insertion, the tuple deletion and the value update to the physical data instance.

A system, as well as articles that include a machine-readable medium storing machine-readable instructions for implementing the various techniques, are disclosed. Details of various embodiments are discussed in greater detail below.

In some embodiments, one or more of the following advantages may be present. For example, the disclosed techniques may provide that no other view tuple be affected by a base tables modification apart from the one specified in the view update command. In addition, no additional tuple (i.e., data row) may appear in the view after the base tables have been modified. Another benefit may relate to view deletions. For example, when a tuple is deleted from a view, the instance of any subview associated with the view may remain unaffected.

Another benefit may relate to using views for insertions. For example, the techniques may ensure that a view insertion introduces tuples in base tables, provided that there are no side-effects.

Additional features and advantages will be readily apparent from the following detailed description, the accompanying drawings and the claims.

BRIEF DESCRIPTION OF THE DRAWINGS

FIG. 6 illustrates an example of an update using an attribute value.

Like reference symbols in the various drawings indicate like elements.

DETAILED DESCRIPTION OF THE PREFERRED EMBODIMENTS

Figure 1:
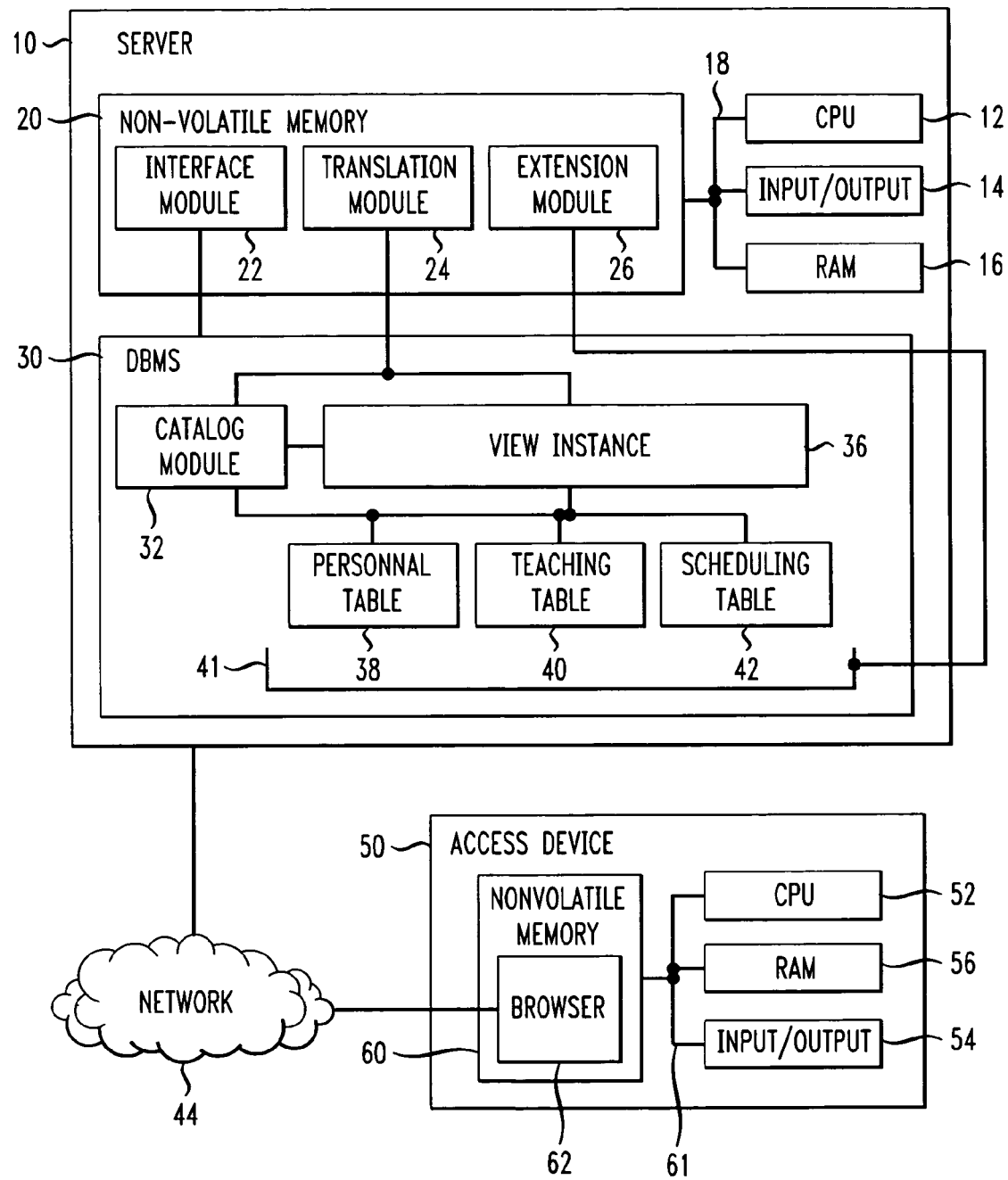
FIG. 1 illustrates a block diagram of a computer system for providing updates through views according to the present invention.

FIG. 1 is a block diagram that illustrates a computer system 5, in which executable program instructions and operational data operating in accordance with the present invention are disclosed. As shown in FIG. 1, a server 10 is provided that includes a central processing unit (CPU) 12, an input-output device 14, a random access volatile memory (RAM) 16, and non-volatile memory 20, all of which are preferably interconnected via a common bus 18 and controlled by the CPU 12.

A network 44 is provided that may include various devices such as servers, routers, and switching elements that may be connected in an extranet, intranet or Internet configuration. In one preferred embodiment, the server 10 communicates with an access device 50 over the network 44 with varying degrees and types of communications and logic capabilities. For instance, wire, fiber optic line, wireless electromagnetic communications by visible light, infrared, and radio frequencies may be implemented on the network 44 as appropriate.

Various communication protocols, e.g., ISO/OSI, IPX, TCP/IP, may be used on the network 44. In the case of the Internet, a single, layered communications protocol (TCP/IP) generally enables communications between the server 10 and the access device 50.

The access device 50 shown in FIG. 1 preferably includes a CPU 52, an input-output device 54, random access memory 56 and non-volatile memory 60, all of which are interconnected via a bus 61 and controlled by the CPU 52. In one preferred embodiment, the non-volatile memory 60 of the access device 50 is configured to include a browser 62 capable of requesting and displaying information from the server 10. The access device 50 may include a personal computer, a laptop computer, or other electronic-based device. Although only one access device is illustrated in FIG. 1, the system may be configured to support multiple access devices. A user using the access device 50 over the network 44 may access the server 10 to process view update requests.

The server 10 of the present invention is configured to include a database management system (DBMS) 30. Examples of DBMS systems, with which the present invention may operate include Oracle™, Sybase™, Informix™, SQL Server™, and DB2™. As shown in FIG. 1, in one preferred embodiment, the DBMS 30 may include a plurality of modules that include executable code and operational data suitable for execution by the CPU 12 and for operation within the non-volatile memory 20 of FIG. 1. It will be appreciated by one skilled in the art that the DBMS 30 shown in FIG. 1 may be distributed across both local and remote computer servers.

The DBMS 30 is configured to include a catalog module 32 that provides listing information (e.g., physical and logical schema information, index information) regarding one or more database objects (e.g., database tables and views) included in the DBMS 30. As shown in the FIG. 1 example, the DBMS 30 also is configured to include a plurality of base tables 41 and a view instance 36. Although only a single view instance is shown in FIG. 1, the present invention is not limited to a single view instance configuration. For example, in some embodiments, one or more base tables and view instances may be included and distributed across local and remote database management systems.

As shown in FIG. 1, the base tables 41 of the DBMS 30 include a personnel table 38, a teaching table 40 and a scheduling table 42 that may be used in a university computing environment. The view instance 36 illustrated in FIG. 1 represents a join view of the base tables 41. The view instance 36 contains data identical to the base tables, but is configured with a heterogeneous schema. The personnel table 38, the teaching table 40, the scheduling table 42 and the view instance 36 will be used as examples throughout this disclosure to explain the present invention.

Figure 2:
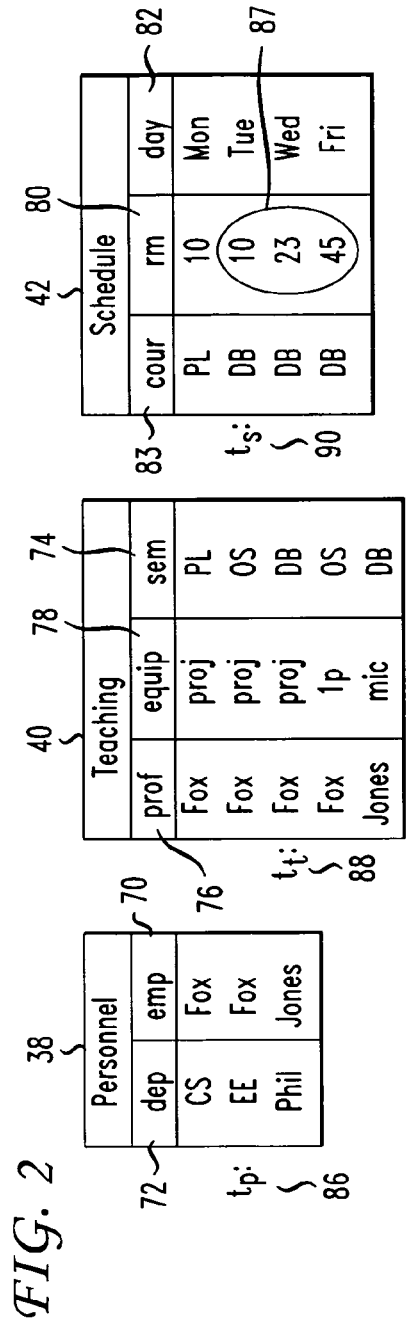
FIG. 2 illustrates examples of base tables and a view instance.

Referring to FIG. 2, details of the personnel table 38, the teaching table 40, the scheduling table 42 and the view instance 36 are shown. As illustrated in FIG. 2, the personnel table 38 stores the department (dep) 72 for each employee (emp) 70 where she is employed. The teaching table 40 stores information concerning seminars (sems) 74 that are taught by professors (prof) 76 and teaching equipment (equip) 78 professors may use. The scheduling table 42 stores information regarding a room number (rm) 80 and the day (day) 82 a seminar course (cour) 83 commences. The view instance 36 is a materialized view that joins the personnel table 38, the teaching table 40 and the scheduling table 42. For example, as shown in FIG. 2, tuple td 84 of the view instance 36 is formed by joining tuples tp:[EE,Fox] 86, tt[Fox, Proj, DB] 88 and ts:[DB, 10, Tue] 90 of base tables personnel 38, teaching 40 and scheduling 42, respectively.

Referring back to FIG. 1, the non-volatile memory 20 of the server 10 is configured to include an interface module 22 that provides a graphical user interface for interacting with the DBMS 30, an extension module 26 that separates the data instance of a view into a logical data instance and a physical data instance, and a translation module 24 that uses identifiers included in the physical data instance to query, insert, update and delete information in base tables.

The extension module 26 of the present invention extends the relational model of base tables by generating an identifier for each relational attribute (e.g., display form value) identified in a base table. In one preferred embodiment, the extension module 26 adds one or more additional columns to each base table. The extension module 26 uses the one or more additional columns to store the identifier associated with each id-value pair, leaving the original column in the base table to represent its display form. In one preferred embodiment, the extension module 26 generates a unique 64-bit integer value that is stored as the identifier. In another preferred embodiment, the extension module 26 generates a 32-bit integer value that is stored as the identifier.

Figure 7:
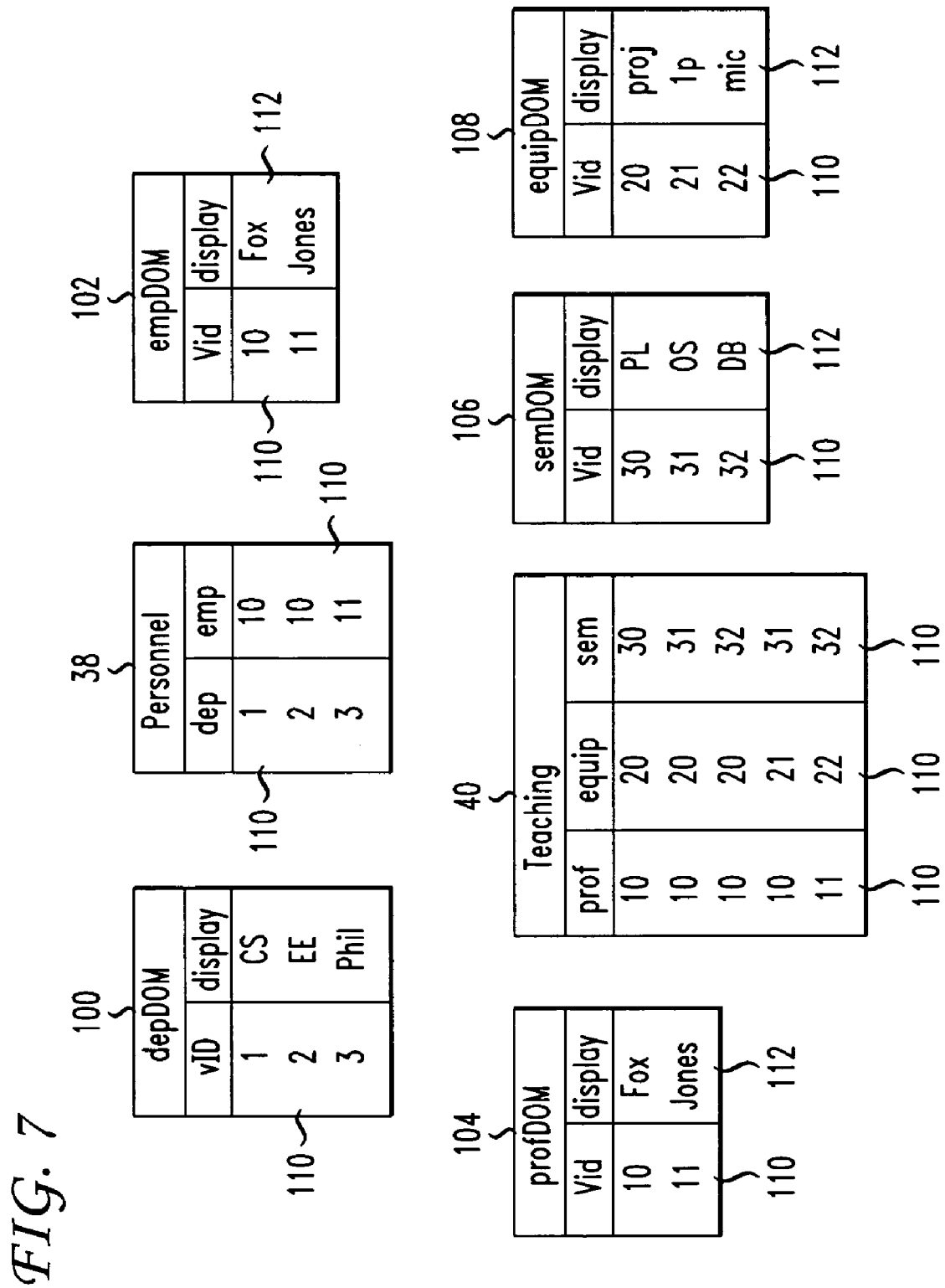
FIG. 7 illustrates an example of a physical data instance.

In another preferred embodiment, the extension module 26 extends the relational model of base tables by generating a set of binary tables, referred to herein as domain tables. In this embodiment, the extension module 26 uses the domain tables to store associated identifier-values from the domain of an attribute. For example, referring now to FIG. 7, a set of domain tables 100, 102, 104, 106, 108 associated with the logical table Teaching 40 and Personnel 38 of FIG. 2 are shown. As shown in FIG. 7, the first column of the domain tables may store an id-value identifier (vID) 110, and the second column of the domain tables may store an id-value display form (display) 112. In this preferred embodiment, each domain table generated corresponds to one and only one attribute of a relation and the id-value identifier column 110 of a domain table may serve as a key. As a result, the relational tables need to store only the id-value identifier.

Figure 4:
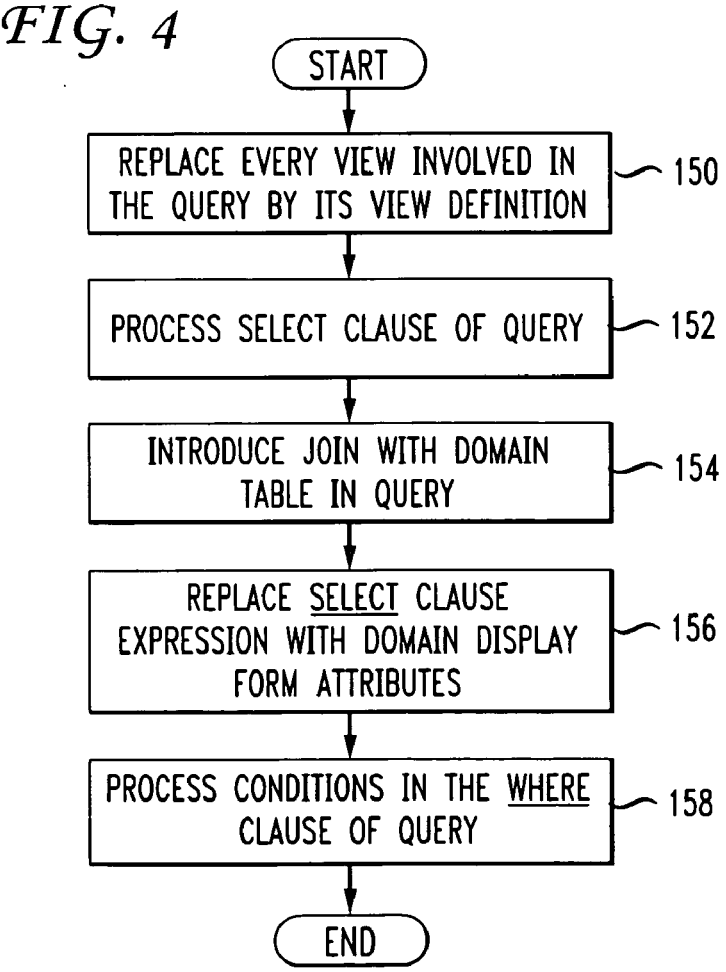
FIG. 4 is a flow chart of a method for translating view queries expressed on base tables.

Referring back to FIG. 1, the translation module 24 translates view queries expressed on base tables to queries on the physical data tables. In one preferred embodiment, referring to FIG. 4, the translation module 24 executes the following method. First, the translation module 24 replaces every view involved in the query by its view definition 150. This process is equivalent to query unfolding. Next, the translation module 24 processes the select clause of the query 152. The translation module 24 selects attributes specified in the query from the physical data instance resulting in tuples of identifiers and not display forms. Next, for each expression in the select clause referencing a display form, the translation module 24 introduces a join with its domain table in the query 154. The join is based on the identifier attribute of the domain table and the referenced attribute of the physical data instance. The translation module 24 then replaces the select clause expression of the query by one using the display form attribute of the domain table 156. Next, the translation module 24 processes the conditions of the where clause in the query 158. For every expression in the where clause referring to a table attribute of the logical base table, the translation module 24 performs the same steps as above. In one embodiment, when an equality join condition appears in the where clause as a result of query unfolding, the translation module 24 allows the join condition to remain unchanged so that the join is based on the identifiers and not the display forms.

For example, in one preferred embodiment, given the view query "select v.day from ViewInstance v where v.emp='Fox'", the translation module 24 performs query unfolding that results in the following query:

select s.day
from Personnel p, Teaching t, Schedule s
where p.emp='Fox' and p.emp=t.prof and t.sem=s.cour.

Next, the translation module 24 introduces a join with the domain table dayDom of attribute day in the query, and replaces the expression s.day by the expression dd.display that selects the display form attribute from the introduced domain table. Similar steps are applied for the expression p.emp of the where clause and the query becomes:

select dd.display AS day
from Personnel p, Teaching t, Schedule s,
dayDom dd, empDom de
where de.display='Fox' and p.emp=t.prof and t.sem=s.cour and s.day=dd.vID and p.emp=de.vID As shown in the above example, the translation module 24 processes values of the physical data instance as a pair, each pair including a display form and an identifier (i.e., id-values). The values at the logical level, with which users and applications interact, remain unchanged. Furthermore, the translation module 24 may use two id-values to form a join if their identifiers are equal. The translation module 24 then maps an id-value to the logical level and displays only a data values display form. This allows the present invention to have different id-values that appear the same at the logical level, but have different identifiers that can participate in different joins.

Figure 3:
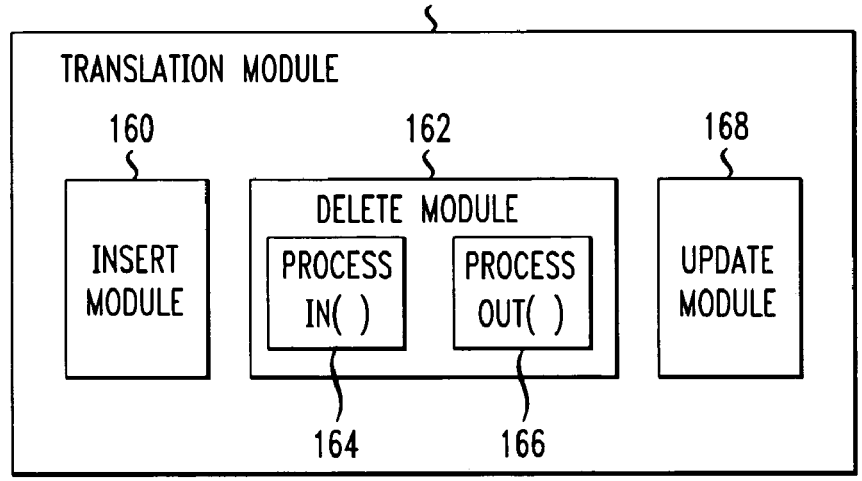
FIG. 3 is a block diagram of preferred components included in a translation module.

Referring now to FIG. 3, components of the translation module 24 are disclosed. As shown in FIG. 3, the translation module 24 includes an insert module 160, a delete module 162 and an update module 168.

The insert module 160 provides for insertions of new tuples into base tables using views. For an insertion of a new tuple tv in a view, the insert module 160 creates the correct tuples in base tables so that their join is tuple tv. In particular, the insert module 160 creates a new tuple tR for every relation (e.g. table) R that appears in the from clause of a view query. For example, if an attribute A of a relation R is used in the select clause of the view query, the insert module 160 creates a new id-value vo for the attribute A of the tuple tR. The identifier o of that id-value differs from any other identifier of an id-value in the domain of A that is already in the database. The display form v is the one specified in the insert statement for the attribute A. Finally, for every two or more attributes that the where clause of the view query specifies or logically implies to be equal, e.g., the join attributes, their identifiers are set the same. One advantage of this technique may be in ensuring that the new tuples tR join to form the tuple tv.

If the insert module 160 determines that values in the insert statement violate pre-defined conditions of the view query, the insert module 160 rejects the insertion statement. For example, referring to the base tables of FIG. 2 and a view V with view query: select * from Personnel, Teaching where emp=prof, if tuple [CS, Berry, Berry, PC, HWJ] is to be inserted in the view, the insert module 160 generates the [CSn1, Berryn2] and [Berryn2, PCn3, HWn4] tuples in the relations personnel 38 and teaching 40, respectively. The identifiers ni are all new identifiers that do not exist in the database. The insert module 160 preserves the join between the two tuples by having the id-value in the attribute emp and prof include the same identifier n2. If instead, tuple [CS, John, Berry, PC, HWJ] was to be inserted in the same view, the insert module 160 rejects the statement since it violates the condition that attributes emp and prof should be equal.

In some preferred embodiments, when the view query projects out certain attributes, the insert module 160 may introduce id-values with null display forms on the projected-out attributes whose value cannot be inferred from the join or the equality conditions in the view.

In another example, if the previously discussed view query did not have the attributes emp and equip in the select clause, then insertion of tuple [CS, Berry, HWJ] in the view is translated by the insert module 160 to insertion of tuple [CSn1, Berryn2] in the personnel table 38 and [Berryn2, nulln3, HWn4] in the teaching table 40.

In a preferred embodiment, the insert module 160 may process the insert command differently if the insert command is for a base table instead of a view. For example, if a tuple ti is to be inserted in a logical schema relation R, then the insert module 160 inserts a new tuple tn in the physical table R. The insert module 160 processes every attribute of tn as an id-value vo where identifier o is a new one and the display form v is the one specified in the respective attribute in tuple ti. For every relation R' that joins with R through attributes A and B, respectively, the insert module 160 duplicates every tuple with a display form in attribute A equal to the display form of attribute B in tn. The insert module 160 also sets the identifier of the id-value in A of the duplicate to be the same as the identifier of the id-value of attribute B in tn. As a result, the behavior expected by the insertion of tuple ti in R may be achieved.

Figure 5:
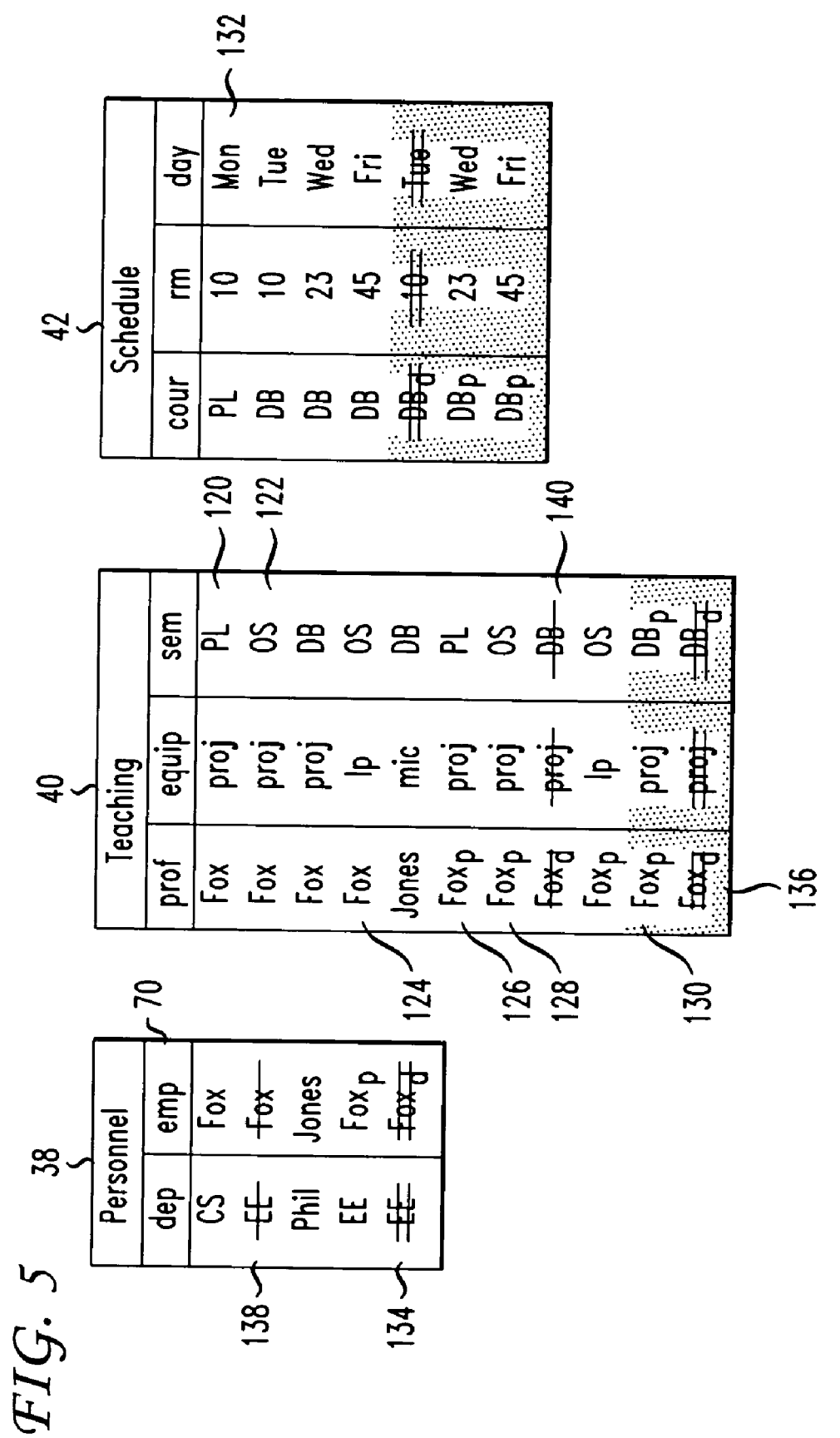
FIG. 5 illustrates examples of modified base tables

In another example, referring to the base tables of FIG. 5, assume that tuple [Fox, mic, DB] is to be inserted in the relation teaching 40 and that tuple [Foxm, micp, DBn] is a new tuple. As shown in FIG. 5, an instance of the identifiers m, p and n do not exist. The tuple is expected to join with every tuple in relation personnel 38 with display form 'Fox' on attribute emp 70. To ensure this, the insert module 160 duplicates every tuple of the personnel table 38 with that property and sets the identifier of the id-value 'Fox' in emp 70 to be m. The insert module 160 then performs similar steps for the Schedule table 42.

The delete module 162 provides deletions from regular tables as well as view instances. In one preferred embodiment, referring to FIG. 4, the delete module 162 processes deletions by duplicating the tuples that participate in the join forming the view tuple under the deletion. In another preferred embodiment, the delete module 162 performs the minimum number of changes in base tables to achieve the view deletion without side-effects in the view and without affecting the instances of the subviews. For example, given views that involve natural joins: R1×R2×Rn where each table Ri refers to a base table, if a Ri is a view, the delete module 162 replaces the view by its view definition by applying query unfolding. The delete module 162 also identifies the common join attribute Ai,j of tables Ri and Rj. When Ri and Rj join on multiple attributes then Ai,j refers to their composite attribute. As a result, the delete module 162 supports cyclic joins as well as self joins when Ri and Rj are the same relation.

In the case of a single tuple delete, in one preferred embodiment, the delete module 162 identifies the single tuple td to be removed from view V. Referring now to FIG. 3, the delete module 162 includes two modules: a processIn module 164 and a processOut module 166 that may be used in processing the single tuple delete td. The method employed by the delete module 162 first identifies the tuple tdi of table Ri that is used in the join forming the view tuple td. For each tdi, during execution of the processIn module 164 and processOut module 166, the delete module 162 generates a single special tuple, referred to as the delete tuple, and one or more special tuples, referred to as preserve tuples. The preserve and delete tuples are clones of existing base table tuples with different (e.g., new) identifiers at the join attributes. In a preferred embodiment, the delete tuples only join among themselves to form the view tuple td. The delete module 162 inhibits every other view or subview tuple that was formed through a join using td from being formed through a join using the preserve tuples. Therefore, the delete module 162 only removes the delete tuples which results in the deletion of only tuple td from the view.

In one preferred embodiment, the delete module 162 employs a join execution graph to visit the relations Ri. In this embodiment, given a view query Qv, the delete module 162 generates a join graph G(V, E) as an undirected graph whose set of nodes is the relations in Qv: V={R1, R2, ... Rn} and set of edges E={(Ri,Rj)|Ri joins Rj through Ai,j}. The join graph generated by the delete module is a connected DAG (Directed Acyclic Graph) obtained from join graph Ge(Ve,Ee) by processing the nodes in Ve to be those in V, processing the edges in E directionally and removing one or more of the edges to make the graph acylic in the event of cyclic joins in the view query, to obtain Ee.

The processIn module 164 of the delete module 162 is invoked for a relation R, that is chosen to be processed when the set predecessors (Ri) is not empty, i.e. node Ri has one or more incoming edges in Ge. The processIn module 164 may assure that changes made in adjacent nodes of Ri in Ge result in no tuples disappearing from the view. In one preferred embodiment, the processIn module 164 executes the following method.

First, the processIn module 164 creates a clone of tuple tdi that is inserted in Ri. The clone differs from tdi only on the id-value of the join attribute corresponding to an incoming edge (Rj, Ri). The new id-value vd generated has the same display form as in tdi, but a different identifier d. For example, as shown in FIG. 6, application of this step on the base tables creates no tuple in the personnel table 38 (no incoming edge), tuple [Foxd, proj, DB] in the table teaching 40 and tuple [DBd, 10, Tue] in the table schedule 42.

The processIn module 164 then creates join-preserve tuples for incoming edges. For example, if (Rj0,Ri), (Rj1, Ri), ..., (Rjk,Ri) are incoming edges of Ri in Ge., the processIn module 164 establishes a tuple t in Ri that joins with tuples tdj0, tdj1, ..., tdjk of relations Rj0, Rj1, ..., Rjk respectively. Next, the processIn module 164 clones tuple t in Ri exactly 2k−2 times. (In case table Ri joins with multiple tables using the same join attribute, k refers to the number of join-attributes that have an incoming edge.) Next, the processIn module 164 enumerates the copied tuples using an index value h in range 1 ... 2k−2. Next, the processIn module 164 generates a new id-value Vpjl, with special identifier p, if the bit position in jl of the binary representation of h is 1, for the id-value of join attribute Ajl,i in the hth clone. When t is not the tuple tdi, for any value of k, the processIn module 164 adds a clone of t to Ri. When t is the tuple tdi, no action is performed.

For example, the teaching table 40 in the join execution graph has only one incoming edge emanating from the table Personnel 38; thus, as shown in FIG. 5, the processIn module 164 clones tuples[Fox, proj, PL] 120, [Fox, proj, OS] 122 and [Fox, 1p, OS] 124 and introduces the respective tuples [Foxp, proj, PL] 126, [Foxp, proj, OS] 128 and [Foxp, 1p, Os] 130.

The schedule table 42 also has one incoming edge 132 from the teaching table 40. Once the processIn module 164 is executed for a relation, the tuple created in the first step is processed as tuple tdi. For example, in the description of the processOut module 166 that follows, the tuple tdi is considered the tuple [Foxd, proj, DB].

The processOut module 166 is invoked when the set successors (Ri) is not empty, i.e. node Ri has one or more outgoing edges in Ge. The processOut module 166 modifies Ri so that tuple tdi does not interfere with other joins apart from the one creating the view tuple td. In one embodiment, the processOut module 166 executes the following method.

First, the processOut module 166 creates a special clone of tuple tdi that is inserted in Ri. In the clone, every join attribute Ai for which there is outgoing edge (Ri, Rj) keeps the same display form but gets a new identifier d. As shown in FIG. 5, the processOut module 166 creates tuples [EE, Foxd] of relation Personnel and [Foxd, proj, DBd] by cloning the td, tuples [EE, Fox] and [Foxd, proj, DB], respectively.

Next, the processOut module 166 creates join-preserve tuples between Ri and adjacent nodes in Ge. The processOut module 166 inserts a clone of tuple tdi in Ri. In the clone, the join attribute Ai,j for which there is outgoing edge (Ri,Rj) in Ge keeps the same display form but receives a new identifier p. The clone is implemented to preserve all the view tuples which were formed through a join using tdi and which should remain in the view after the deletion of td. For example, as shown in FIG. 5, tuples [EE, Foxd] 134 in the personnel table 38 and [Foxd, proj, DBd] 136 in the teaching table 40 were created by cloning tuples [EE, Fox] 138 and [Foxd, proj, DB] 140 respectively, due to their join with tuples in relations Teaching 40 and Schedule 42.

Next, the processOut module 166 removes the tuple tdi from Ri. As shown in FIG. 5, single-strike-through tuples illustrate the deletion during this step.

Once the processIn and processOut modules 164, 166 have completed, the special delete tuple created in each table is removed by the delete module 162 without side-effects. Referring to FIG. 5, deletion of these tuples are illustrated as double-strike-throughs.

The delete module 162 processes multiple view tuples to be deleted similarly to a single view tuple delete. In a multiple view delete, the delete module 162 allows tdi to refer to a multitude of tuples. In that circumstance, the delete module 162 generates one special delete tuple using the processOut module 166 and the processIn module 164 for the multitude of tuples instead of one for each of its tuples.

The update module 168 performs updates on base tables as is typically performed in the relational model. In one embodiment, the update module 168 processes an update on a view as a deletion followed by an insertion. In some preferred embodiments, the update module 168 issues a virtual delete followed by a base table value update. The virtual delete is similar to the operations performed by the delete module 162 described previously. The difference is that at the end the delete tuples (the double strike-through tuples shown in FIG. 5) are not removed by the update module 168. As a result, the update module 168 issues an update that modifies the display forms of their id-values appropriately with no side-effect in the view.

For example, given the update command Update Vb set emp=rm where dep='EE' and sem='DB', the update module 168 sets the emp attribute of tuple td 84 in FIG. 2 and the subsequent two tuples 85 to the value of their rm attribute 87, which is '10', '23', and '45', respectively. The difference shown between FIG. 5 and FIG. 6 is that the double strike-through tuples are not deleted but instead are replicated by the update module 168 with identifiers d10, d23, and d45 144.

Various features of the system may be implemented in hardware, software, or a combination of hardware and software. For example, some features of the system may be implemented in one or more computer programs executing on programmable computers. In addition, each such computer program may be stored on a storage medium such as read-only-memory (ROM) readable by a general or special purpose programmable computer or processor, for configuring and operating the computer to perform the functions described above.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

The invention claimed is:

1. A computer implemented method of propagating updates to views associated with base tables comprising:
    associating an identifier with a data value included in a physical storage location of at least one base table;
    receiving at least one of a tuple insertion, a tuple deletion and a value update, each of which comprises command information;
    mapping the command information to the physical storage location using a view definition;
    applying the at least one of the tuple insertion, tuple deletion and value update to the physical storage location using the identifier, such that, an update to the physical storage location is reflected in the at least one base table,
    wherein the mapping comprises generating a clone tuple and a preserve tuple, the clone tuple and preserve tuple associated with the at least one of the tuple insertion, the tuple deletion and the value update,
    wherein the mapping comprises generating a join-graph, the join-graph associated with the physical storage location, and
    wherein the join-graph is a directed acyclic graph.

2. The method of claim 1, wherein the physical storage location includes an id-value pair, the id-value pair linking the identifier and the value.

3. The method of claim 1, wherein associating the identifier with a data value comprises adding an attribute to the physical storage location.

4. The method of claim 1, wherein the mapping comprises performing query unfolding.

5. A machine-readable storage medium comprising machine-readable instructions that, when applied to a machine, cause the machine to:
    associate an identifier with a data value included in a physical storage location of at least one base table;
    map command information to the physical storage location using a view definition in response to receiving at least one of a tuple insertion, a tuple deletion and a value update, each of which comprises the command information;
    apply the at least one of the tuple insertion, tuple deletion and value update to the physical storage location using the identifier, such that, an update to the physical storage location is reflected in the at least one base table,
    when applied to the machine, cause the machine to generate a clone tuple and a preserve tuple, the clone tuple and preserve tuple associated with the at least one of the tuple insertion, the tuple deletion and the value update,
    when applied to the machine, cause the machine to generate a join-graph, the join-graph associated with the physical storage location, and
    when applied to the machine, cause the machine to generate a directed acyclic graph.

6. The article of claim 5, including instructions that, when applied to the machine, cause the machine to include an id-value pair in the physical storage location, the id-value pair linking the identifier and the value.

7. The article of claim 5, including instructions that, when applied to the machine, cause the machine to add an attribute to the physical storage location.

8. The article of claim 5, including instructions that, when applied to the machine, cause the machine to perform query unfolding.

9. A computer-implemented system comprising:
    a network;
        a device coupled to the network, the device configured to include a server; and
        a service delivery device coupled to the network, the service delivery device including a processor and memory storing instructions that, in response to receiving a first type of request for access to a service, cause the processor to:
    associate an identifier with a data value included in a physical storage location of at least one base table;
    map command information to the physical storage location using a view definition in response to receiving at least one of a tuple insertion, a tuple deletion and a value update, each of which comprises the command in formation;
    apply the at least one of the tuple insertion, tuple deletion and value update to the physical storage location using the identifier, such that, an update to the physical storage location is reflected in the at least one base table,
    in response to receiving the first type of request over the network, cause the processor to generate a clone tuple and a preserve tuple, the clone tuple and preserve tuple associated with the at least one of the tuple insertion, the tuple deletion and the value update,
    in response to receiving the first type of request over the network, cause the processor generate a join-graph, the join-graph associated with the physical storage location, and
    in response to receiving the first type of request over the network, cause the processor generate a directed acyclic graph.

10. The system of claim 9, wherein the memory stores instructions that, in response to receiving the first type of request over the network, cause the processor to include an id-value pair in the physical storage location, the id-value pair linking the identifier and the value.

11. The system of claim 9, wherein the memory stores instructions that, in response to receiving the first type of request over the network, cause the processor to add an attribute to the physical storage location.

* * * * *